United States Patent [19]

Jones et al.

[11] Patent Number: 4,458,881

[45] Date of Patent: Jul. 10, 1984

[54] PICKUP WINCH

[76] Inventors: Cleveland B. Jones, c/o George Spector, 3615 Woolworth Bldg., 233 Broadway; George Spector, c/o Cleveland B. Jones, 3615 Woolworth Bldg., 233 Broadway, both of New York, N.Y. 10007

[21] Appl. No.: 423,133

[22] Filed: Sep. 24, 1982

[51] Int. Cl.³ .......................... B66D 3/02; B65G 67/06

[52] U.S. Cl. .................................... 254/326; 254/332; 242/86.5 R

[58] Field of Search ............... 254/224, 235, 243, 279, 254/280, 281, 323, 324, 325, 326, 329, 332, 334; 242/86.5 R, 106

[56] References Cited

U.S. PATENT DOCUMENTS

| | | | |
|---|---|---|---|
| 907,803 | 12/1908 | Hulbert | 254/233 X |
| 4,004,366 | 1/1977 | Berry | 242/106 X |
| 4,215,849 | 8/1980 | Charland | 254/326 |
| 4,269,396 | 5/1981 | Easterwood | 254/325 |
| 4,278,214 | 7/1981 | Caldwell | 242/86.5 R X |
| 4,304,372 | 12/1981 | Smith et al. | 242/106 X |

*Primary Examiner*—John M. Jillions
*Assistant Examiner*—Joseph J. Hail, III

[57] ABSTRACT

A pickup winch is provided and consists of a manual winch; an elongated horizontal frame, a plate affixed to the bottom of the manual winch and affixed to the center of the elongated horizontal frame, a pair of vertical posts affixed perpendicular and downward from each end of the elongated horizontal frame that removably mounts the stake pockets in the side walls of the cargo bed of a pickup truck, a pulley to engage the cable of the manual winch, a channel affixed perpendicular and downward from bottom of the plate having a plurality of transverse apertures in the side walls of the channel, a bolt placed within one set of the transverse apertures in the side walls of the channel to hold the pulley, a nut threaded onto the end of the bolt, an eye bolt affixed perpendicular and upward from one end of the elongated horizontal frame, an extension rod placed through the eye bolt and affixed to the shaft of the manual winch and a crank removably connected to the free end of the extension rod.

1 Claim, 5 Drawing Figures

PICKUP WINCH

BACKGROUND OF THE INVENTION

The instant invention relates generally to winches and more specifically it relates to a winch used in the cargo bed of a pickup truck.

It is a known fact that pickup trucks are being used more today because they are cheaper to run and can get around quicker. They aren't as expensive as the bigger trucks and one man can handle it better. Heavy loads are hard to place into the cargo bed of pickup trucks and so accordingly this situation is in need of an improvement.

SUMMARY OF THE INVENTION

A principle object of the present invention is to provide a pickup winch that is removably mounted between the rear pair of stake pockets in the side walls of a cargo bed of a pickup truck.

Another object is to provide a pickup winch that can hold and adjust the height of a pulley from a manual winch.

An additional object is to provide a pickup winch that can extend the cranking capabilities of the manual winch to one side of the cargo bed.

A further object is to provide a pickup winch that can position the angle adjustment of the manual winch.

A still further object is to provide a pickup winch that can adjust the extending cranking capabilities of the manual winch to one side of the cargo bed.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENT

Figure 1:
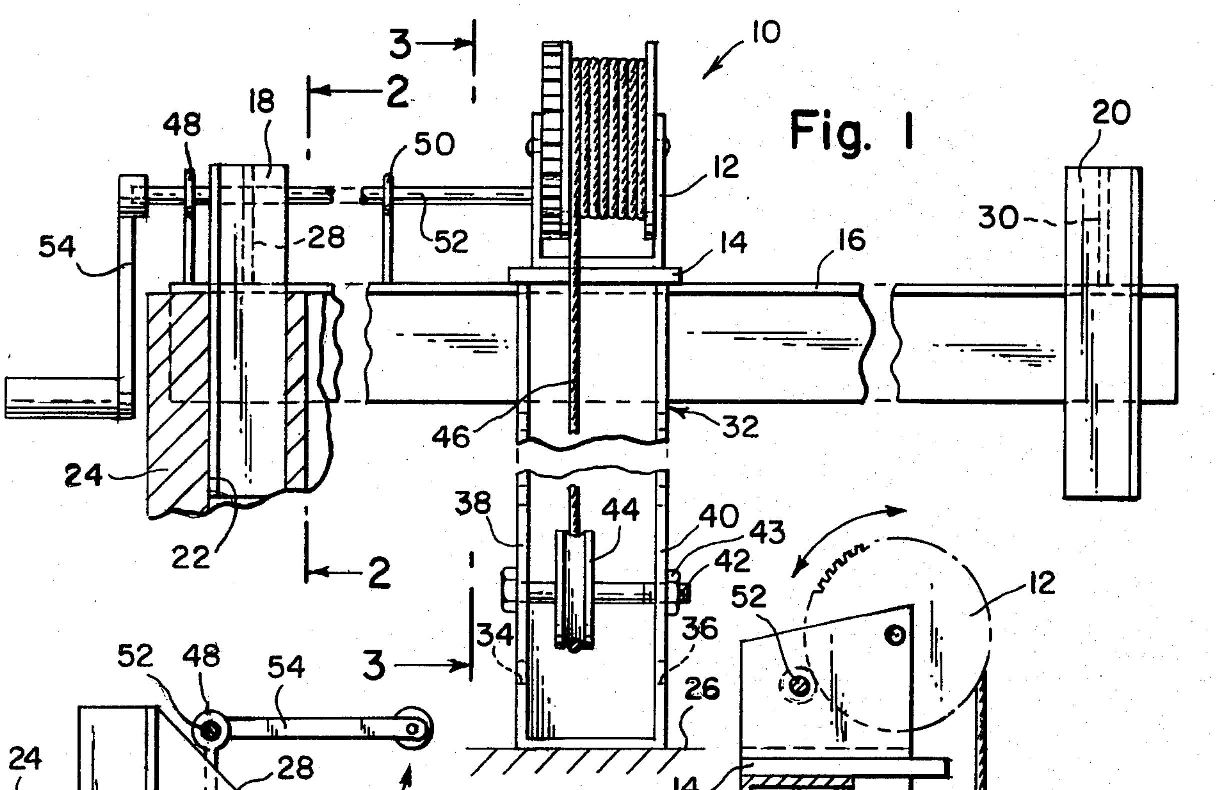
FIG. 1 is a front view of the invention with parts broken away.
Figure 2:
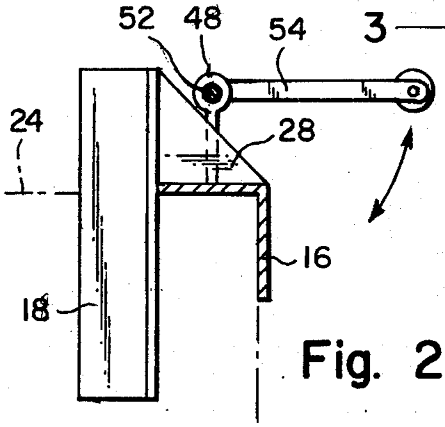
FIG. 2 is a cross-sectional view taken along line 2—2 in FIG. 1.
Figure 3:
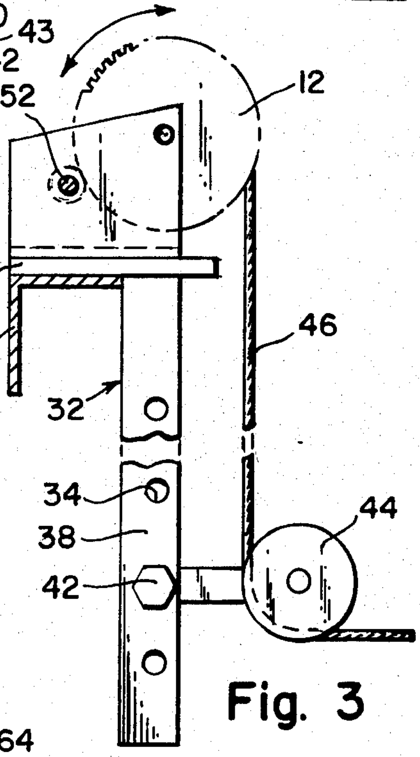
FIG. 3 is a cross-sectional view taken along line 3—3 in FIG. 1.

Turning now descriptively to the drawings, in which similar reference characters denote similar elements throughout the several views, FIGS. 1 through 3, illustrates a pickup winch 10. The pickup winch 10 consists of a manual winch 12 affixed to a plate which is in turn affixed to the center of an elongated horizontal frame 16.

A pair of vertical posts 18 and 20 are affixed perpendicular and downward from each end of the elongated horizontal frame 16. The post 18 as best shown in FIG. 1, is removably mounted within a rear stake pocket 22 in the side wall 24 of a cargo bed 26 of a pickup truck. The post 20 is also removably mounted within the other rear stake pocket in the other wall (not shown) of the cargo bed 26. A triangular brace 28 may be placed between the frame 16 and the post 18 for a stronger connection. Likewise a triangular brace 30 may be placed between the frame 16 and the post 20. The frame 16 and posts 18 and 20 can be made of angle irons but any material can be used.

A channel 32 is affixed perpendicular and downward from the bottom of the plate 14. The channel 32 has a plurality of transverse apertures 34 and 36 in the side walls 38 and 40. A bolt 42 and nut 43 is placed within one set of transverse apertures 34 and 36 in the side walls 38 and 40 of the channel 32 to hold a pulley 44 that will engage a cable 46 of the manual winch 12. The pulley can be adjusted by changing the location of the bolt in the apertures 34 and 36.

A pair of eye bolts 48 and 50 are affixed perpendicular and upward from one end of the elongated horizontal frame 16. An extension rod 52 is placed through the eye bolts 48 and 50 and is affixed to the shaft of the manual winch 12. A crank 54 is removably connected to the free end of the extension rod 52. This extends the cranking capabilities of the manual winch 12 to one side of the cargo bed 26.

Figure 4:
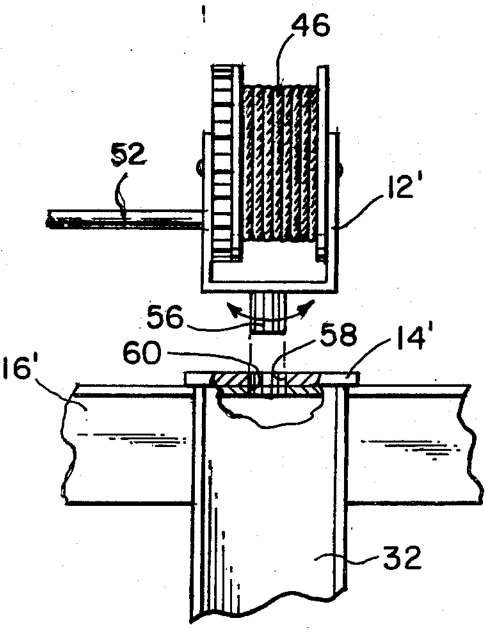
FIG. 4 is a partial front view of an altermate embodiment of the invention.

Another embodiment is shown in FIG. 4, in which there is an angle adjustment of the manual winch 12'. The winch 12' has a knurled pin 56 affixed to the bottom. The plate 14' has knurled aperture 58 at the center and is affixed to the center of the elongated horizontal frame 16' that also has a knurled aperture 60. The knurled aperture 58 of the plate 14' lines up with the knurled aperture 60 of the elongated horizontal frame 16'. The manual winch 12' can be placed in any positioned angle and be affixed to the plate 14' when the knurled pin 56 is placed within the knurled aperture 58 of the plate 14' and knurled aperture 60 of the elongated horizontal frame 16'.

Figure 5:
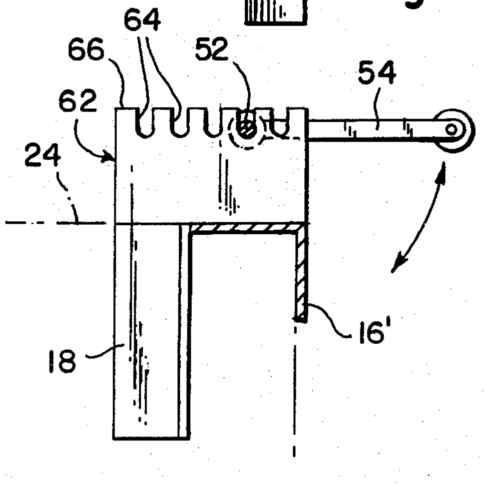
FIG. 5 is a cross-sectional view of the alternate embodiment of the invention similar to FIG. 2.

FIG. 5 shows how to adjust the extending cranking capabilities of the manual winch 12' to one side of the cargo bed 26. A brace 62 has a plurality of open slots 64 on the top edge 66. The bottom edge of the brace 62 is affixed perpendicular and upward from one end of the elongated horizontal frame 16'.

The extension rod 52 is still affixed to the shaft of the manual winch 12' and placed through one open slot 64 on the top edge 66 of the brace 62 to allow for angle adjustment of the manual winch 12'. The crank 54 can now be removably connected to the free end of the extension rod 52.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A pickup winch which comprises:

(a) a manual winch;

(b) means for removably mounting said manual winch between rear pair of stake pockets in side walls of cargo bed of pickup truck;

(c) a pulley to engage cable of said manual winch;

(d) means for holding and adjusting height of said pulley from said manual winch; and (e) means for extending cranking capabilities of said manual winch to one side of said cargo bed wherein said means for removably mounting said manual winch between rear pair of stake pockets in side walls of cargo bed of pickup truck comprises:
(a) an elongated horizontal frame;
(b) a plate affixed to bottom of said manual winch and affixed to center of said elongated horizontal frame;
(c) a pair of vertical posts affixed perpendicular and downward from each end of said elongated horizontal frame that removably mounts said stake pockets wherein said means for holding and adjusting height of said pulley from said manual winch comprises:
(a) a channel affixed perpendicular and downward from bottom of said plate having a plurality of transverse apertures in side walls of said channel;
(b) a bolt placed within one set of said transverse apertures in said side walls of said channel to hold said pulley; and
(c) a nut threaded onto end of said bolt which further comprises:
(a) means for positioning angle adjustment of said manual winch; and
(b) means for angularly adjusting the means for extending cranking capabilities of said manual winch in a horizontal plane to one side of said cargo bed wherein said means for positioning angle adjustment of said manual winch comprises:
(a) said elongated horizontal frame having a knurled aperture at center;
(b) said plate having a knurled aperture at center and affixed to center of said elongated horizontal frame whereby said knurled aperture of said plate lines up with said knurled aperture of said elongated horizontal frame; and
(c) a knurled pin affixed to bottom of said manual winch so that when said knurled pin is placed within knurled aperture of said plate and knurled aperture of said elongated horizontal frame said manual winch can be placed in several positioned angles along the horizontal plane and be affixed to said plate wherein said means for angularly adjusting the means for extending cranking capabilities of said manual winch in a horizontal plane to one side of said cargo bed comprises:
(a) a brace having a plurality of open slots on top edge with bottom edge affixed perpendicular and upward from one end of said elongated horizontal frame:
(b) an extension rod affixed to shaft of said manual winch and placed through one open slot on said top edge of said brace to allow for angle adjustment of said manual winch; and
(c) a crank removably connected to free end of said extension rod.

* * * * *